United States Patent
Shen

(10) Patent No.: US 10,003,917 B2
(45) Date of Patent: Jun. 19, 2018

(54) TERMINAL POSITIONING METHOD AND SYSTEM, TARGET TERMINAL AND POSITIONING SERVER

(71) Applicant: BOE TECHNOLOGY GROUP CO., LTD., Beijing (CN)

(72) Inventor: Chenyin Shen, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 0 days. days.

(21) Appl. No.: 15/301,722

(22) PCT Filed: Dec. 21, 2015

(86) PCT No.: PCT/CN2015/098008
§ 371 (c)(1),
(2) Date: Oct. 4, 2016

(87) PCT Pub. No.: WO2017/028433
PCT Pub. Date: Feb. 23, 2017

(65) Prior Publication Data
US 2017/0180924 A1    Jun. 22, 2017

(30) Foreign Application Priority Data
Aug. 17, 2015 (CN) .......................... 2015 1 0505723

(51) Int. Cl.
*H04W 4/02* (2018.01)
*G06T 7/70* (2017.01)

(52) U.S. Cl.
CPC ................. *H04W 4/02* (2013.01); *G06T 7/70* (2017.01)

(58) Field of Classification Search
CPC .................................... H04W 4/02; G06T 7/70
See application file for complete search history.

(56) References Cited

U.S. PATENT DOCUMENTS

2007/0072623 A1* 3/2007 Shyr ....................... G01S 19/05
455/456.1
2010/0250136 A1* 9/2010 Chen ................. G06F 17/30247
701/300
(Continued)

FOREIGN PATENT DOCUMENTS

CN        101945327 A      1/2011
CN        102158530 A      8/2011
(Continued)

OTHER PUBLICATIONS

International Search Report and Written Opinion for Application No. PCT/CN2015/098008, dated Apr. 29, 2016, 8 Pages.
(Continued)

*Primary Examiner* — Kamran Afshar
*Assistant Examiner* — Minjung Kim
(74) *Attorney, Agent, or Firm* — Brooks Kushman P.C.

(57) ABSTRACT

The present disclosure provides a terminal positioning method for a positioning server. The method includes: receiving image data transmitted by a target terminal, obtaining target feature information based on the image data, wherein the target feature information represents an environment feature of the target terminal, looking up a table of predetermined correspondences between pieces of feature information and pieces of location information, so as to determine target location information corresponding to the target feature information, and transmitting the target location information to the target terminal. According to the present disclosure for terminal positioning, more accurate target location information may be obtained to improve the positioning accuracy and reliability.

17 Claims, 7 Drawing Sheets

(56) References Cited

U.S. PATENT DOCUMENTS

| | | | |
|---|---|---|---|
| 2011/0150324 A1 | 6/2011 | Ngan et al. | |
| 2012/0232954 A1 | 9/2012 | Calman et al. | |
| 2013/0101163 A1* | 4/2013 | Gupta | G06K 9/00671 382/103 |
| 2013/0182891 A1* | 7/2013 | Ling | G06F 17/30241 382/103 |
| 2015/0148069 A1* | 5/2015 | Ling | G06F 17/30241 455/456.1 |

FOREIGN PATENT DOCUMENTS

| | | |
|---|---|---|
| CN | 103067856 A | 4/2013 |
| CN | 103813451 A | 5/2014 |
| CN | 104657389 A | 5/2015 |

OTHER PUBLICATIONS

First Office Action for Chinese Application No. 201510505723.1, dated Jan. 19, 2018, 7 Pages.

* cited by examiner

US 10,003,917 B2

TERMINAL POSITIONING METHOD AND SYSTEM, TARGET TERMINAL AND POSITIONING SERVER

CROSS-REFERENCE TO RELATED APPLICATIONS

This application is the U.S. national phase of PCT Application No. PCT/CN2015/098008 filed on Dec. 21, 2015, which claims priority to Chinese Patent Application No. 201510505723.1 filed on Aug. 17, 2015, the disclosures of which are incorporated in their entirety by reference herein.

TECHNICAL FIELD

The present disclosure relates to the technical field of telecommunication, in particular to a terminal positioning method, a terminal positioning system, a target terminal and a positioning server.

BACKGROUND

The Global Positioning System (GPS) is used for positioning and navigating globally in a real-time manner. The GPS is an excellent example of applying the satellite communication technique in the navigation field, which may provide navigation information such as three-dimensional (3D) location, speed and timing to worldwide users. In addition, with the deployment of the GPS, the information-based society is established around the world in a better manner, which has been a significant boost for the development of digital economy.

In the related art, the GPS is consisted of three parts, i.e. a ground-based control part, a space-based part and a user equipment part. The ground-based control part is configured to manage and maintain the whole ground-based control system, and provide navigation data and instructions to satellites. The space-based part is consisted of 24 satellites distributed on six orbits, and configured to keep transmitting positioning information. The user equipment part is a GPS signal receiver, and configured to receive the positioning information transmitted by the space-based part. In addition, the GPS signal receiver is usually mounted on a terminal.

In the case that a terminal receives a signal of the positioning information transmitted by the space-based part, the signal may be adversely affected by the space environment. As a result, it is possible that the terminal does not receive the positioning information timely and accurately. In addition, the indoor positioning ability of the GPS is poor, and thus such positioning result is unreliable.

SUMMARY

(1) Technical Problems to be Solved

An object of the present disclosure is to provide a terminal positioning method, a terminal positioning system, a target terminal and a positioning server, so as to improve the positioning accuracy and reliability.

(2) Technical Solutions

For achieving the above object, the present disclosure provides following technical solutions.

In one aspect, the present disclosure provides in some embodiments a terminal positioning method for a positioning server including: receiving image data transmitted by a target terminal; obtaining target feature information based on the image data, wherein the target feature information represents an environment feature of the target terminal; looking up a table of predetermined correspondences between pieces of feature information and pieces of location information, so as to determine target location information corresponding to the target feature information; and transmitting the target location information to the target terminal.

Alternatively, the correspondences between pieces of the feature information and pieces of the location information include correspondences between pieces of the feature information and map coordinates, and before the step of receiving the image data transmitted by the target terminal, the method further includes: dividing a region managed by the positioning server into N sub-regions, wherein each of the sub-regions corresponds to one block of a grid and N is an integer greater than 1; determining map coordinates corresponding to each block of the grid based on pre-stored map coordinate information, so as to obtain correspondences between the blocks and the map coordinates; obtaining correspondences between the blocks and pieces of feature information by collecting feature information of each block; and establishing correspondences between pieces of the feature information and the map coordinates based on the correspondences between the blocks and the map coordinates as well as the correspondences between the blocks and pieces of the feature information.

Alternatively, after the step of establishing correspondences between pieces of the feature information and the map coordinates based on the correspondences between the blocks and the map coordinates as well as the correspondences between the blocks and pieces of the feature information, the method further includes: receiving GPS data transmitted by any terminal in the case that the GPS data has been received by the terminal, wherein the GPS data includes coordinate data and supplementary feature information; converting the coordinate data into target map coordinates; and adding a correspondence between the supplementary feature information and the target map coordinates into the correspondences between pieces of the feature information and the map coordinates.

In another aspect, the present disclosure provides in some embodiments a terminal positioning method for a target terminal including: collecting image data; transmitting the image data to a positioning server, such that the positioning server obtains target feature information based on the image data, wherein the target feature information represents an environment feature of the target terminal; and receiving target location information transmitted by the positioning server, wherein the target location information is obtained by the positioning server by looking up a table of predetermined correspondences between pieces of feature information and pieces of location information.

Alternatively, before the step of transmitting the image data to the positioning server, the method further includes: detecting whether the target terminal has received GPS data; and the step of collecting the image data includes: collecting the image data in the case that the target terminal has not yet received the GPS data.

Alternatively, the method further includes: transmitting the GPS data to the positioning server in the case that the target terminal has received the GPS data.

Alternatively, the pieces of the feature information include text feature information, structure feature information of objects, or the text feature information and the structure feature information of objects.

Alternatively, the image data is at least one of a picture and a video, the step of collecting the image data includes: collecting at least one of the picture and the video as the image data.

In yet another aspect, the present disclosure provides in some embodiments a positioning server including: a first receiving unit configured for receiving image data transmitted by a target terminal; an obtaining unit configured for obtaining target feature information based on the image data, wherein the target feature information represents an environment feature of the target terminal; a looking-up unit configured for looking up a table of predetermined correspondences between pieces of feature information and pieces of location information, so as to determine target location information corresponding to the target feature information; and a transmitting unit configured for transmitting the target location information to the target terminal.

Alternatively, the correspondences between pieces of the feature information and pieces of the location information include correspondences between pieces of the feature information and map coordinates, and the positioning server further includes: a dividing unit configured for dividing a region managed by the positioning server into N sub-regions, wherein each of the sub-regions corresponds to one block of a grid and N is an integer greater than 1; a determining unit configured for determining a map coordinate corresponding to each block of the grid based on pre-stored map coordinate information, so as to obtain correspondences between the blocks and the map coordinates; a collecting unit configured for obtaining correspondences between the blocks and pieces of feature information by collecting feature information of each block; and an establishing unit configured for establishing correspondences between pieces of the feature information and the map coordinates based on the correspondences between the blocks and the map coordinates as well as the correspondences between the blocks and pieces of the feature information.

Alternatively, the positioning server further includes: a second receiving unit configured for receiving GPS data transmitted by any terminal in the case that the GPS data has been received by the terminal, wherein the GPS data includes coordinate data and supplementary feature information; a converting unit configured for converting the coordinate data into a target map coordinates; and an adding unit configured for adding a correspondence between the supplementary feature information and the target map coordinates into the correspondences between pieces of the feature information and the map coordinates.

In still yet another aspect, the present disclosure provides in some embodiments a target terminal including: a collecting unit configured for collecting image data; a first transmitting unit configured for transmitting the image data to a positioning server, such that the positioning server obtains target feature information based on the image data, wherein the target feature information represents an environment feature of the target terminal; and a receiving unit configured for receiving target location information transmitted by the positioning server, wherein the target location information is obtained by the positioning server by looking up a table of predetermined correspondences between pieces of feature information and pieces of location information.

Alternatively, the target terminal further includes: a detecting unit configured for detecting whether the target terminal has received GPS data, wherein the collecting unit collects the image data in the case that the target terminal has not yet received the GPS data.

Alternatively, the target terminal further includes: a second transmitting unit configured for transmitting the GPS data to the positioning server in the case that the target terminal has received the GPS data.

Alternatively, the pieces of the feature information include text feature information, structure feature information of objects, or the text feature information and the structure feature information of objects.

Alternatively, the image data is at least one of a picture and a video, the collecting unit is configured for collecting at least one of the picture and the video as the image data.

In still yet another aspect, the present disclosure provides in some embodiments a terminal positioning system including a positioning server and the target terminal; wherein the positioning server is configured for receiving image data transmitted by a target terminal; obtaining target feature information based on the image data, wherein the target feature information represents an environment feature of the target terminal; looking up a table of predetermined correspondences between pieces of feature information and pieces of location information, so as to determine target location information corresponding to the target feature information; and transmitting the target location information to the target terminal.

Alternatively, the correspondences between pieces of the feature information and pieces of the location information include correspondences between pieces of the feature information and map coordinates, and the positioning server is further configured for: dividing a region managed by the positioning server into N sub-regions, wherein each of the sub-regions corresponds to one block of a grid and N is an integer greater than 1; determining map coordinates corresponding to each block of the grid based on pre-stored map coordinate information, so as to obtain correspondences between the blocks and the map coordinates; obtaining correspondences between the blocks and pieces of feature information by collecting feature information of each block; and establishing correspondences between pieces of the feature information and the map coordinates based on the correspondences between the blocks and the map coordinates as well as the correspondences between the blocks and pieces of the feature information.

Alternatively, the positioning server is further configured for: receiving GPS data transmitted by any terminal in the case that the GPS data has been received by the terminal, wherein the GPS data includes coordinate data and supplementary feature information; converting the coordinate data into target map coordinates; and adding a correspondence between the supplementary feature information and the target map coordinates into the correspondences between pieces of the feature information and the map coordinates.

(3) Advantageous Effects

The embodiments of the present disclosure at least achieve the following advantageous effects.

In the terminal positioning method, the terminal positioning system, the target terminal and the positioning server according to the embodiments of the present disclosure, the image data is transmitted to the positioning server from the target terminal, and then the positioning server obtains the target feature information based on the image data, and looks up a table of predetermined correspondences between pieces of feature information and pieces of location information, so as to determine target location information corresponding to the target feature information, and then transmits the target location information to the target terminal.

Thus, the positioning process is accomplished. As compared with the related art, the present disclosure may position a location of the terminal without GPS positioning, so as to improve the positioning accuracy and reliability.

It should be appreciated that, the above general description and the following detailed description are for illustration purposes only, and the present disclosure is not limited thereto.

BRIEF DESCRIPTION OF THE DRAWINGS

In order to illustrate the technical solutions of the present disclosure or the related art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort. Elements in the figures have not necessarily been drawn to scale, and similar reference signs may represent similar components in various figures. Similar reference signs with different suffix letter may represent different examples of similar components. The embodiments of the present disclosure are generally illustrated in the figures in a non-limiting manner.

DETAILED DESCRIPTION

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, some technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Hereinafter, it will be discussed in details associated with figures and embodiments for further clarifying objects, technical solutions and advantages of the present disclosure.

Figure 1:
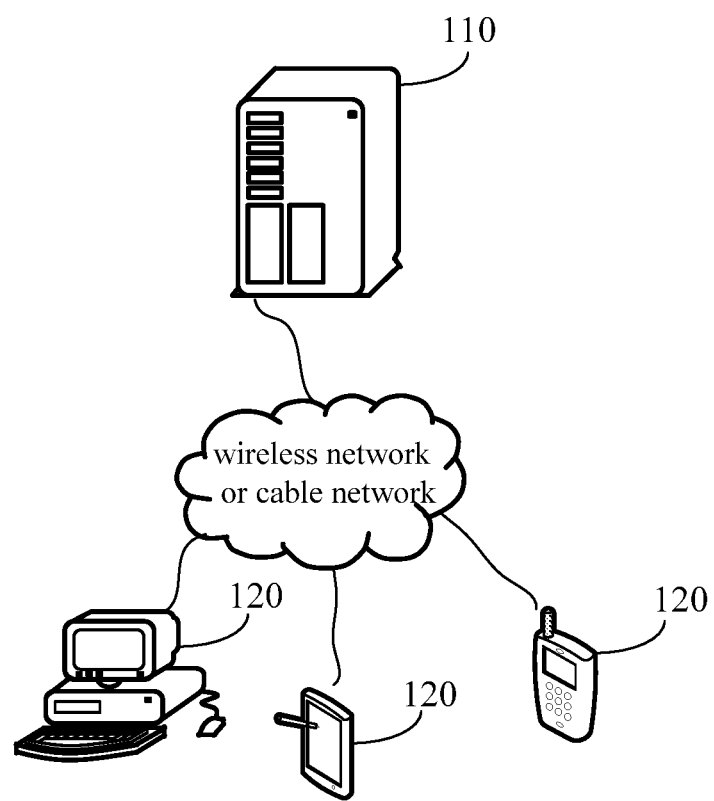
FIG. 1 is a schematic view showing an implementation environment according to embodiments of the present disclosure.

FIG. 1 is a schematic view showing an implementation environment according to the embodiments of the present disclosure. The implementation environment may include a positioning server 110 and a target terminal 120.

The positioning server 110 may be a single server, a server cluster consisted of a plurality of servers, or a cloud computing service center.

The target terminal 120 may be any device capable of obtaining image data, such as a mobile phone, a computer, a digital broadcasting terminal, a message transceiving device, a game console, a tablet device, a medical equipment, a fitness equipment or a personal digital assistant.

The positioning server 110 and the target terminal 120 may be in a wireless connection or a cable connection. The target terminal 120 may collect the image data, and then transmit the image data to the positioning server 110. The positioning server 110 may obtain target feature information based on the image data, and then look up a table of predetermined correspondences between pieces of feature information and pieces of location information, so as to determine target location information corresponding to the target feature information. Then, the positioning server 110 transmits the target location information to the target terminal 120. Finally, the target terminal 120 displays the target location information. The target terminal 120 is further configured for transmitting GPS data to the positioning server 110 in response to receiving the GPS data, such that the positioning server 110 may update the table of the correspondences between pieces of feature information and pieces of location information, thereby obtaining more accurate target feature information.

Figure 2:
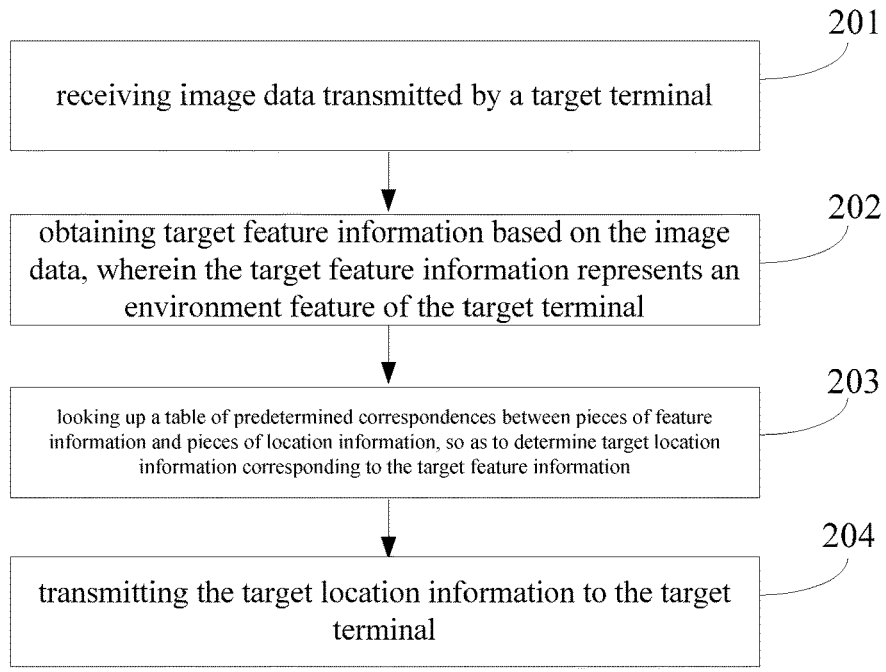
FIG. 2 is a flowchart showing a terminal positioning method according to the embodiments of the present disclosure.

The present disclosure provides in some embodiments a terminal positioning method for the positioning server 110 as shown in FIG. 1. As shown in FIG. 2, the method includes: Step 201: receiving image data transmitted by a target terminal; Step 202: obtaining target feature information based on the image data, wherein the target feature information represents an environment feature of the target terminal; Step 203: looking up a table of predetermined correspondences between pieces of feature information and pieces of location information, so as to determine target location information corresponding to the target feature information; and Step 204: transmitting the target location information to the target terminal.

To sum up, in the terminal positioning method according to the embodiments of the present disclosure, the image data is transmitted to the positioning server from the target terminal, and then the positioning server obtains the target feature information based on the image data, and looks up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

Alternatively, the correspondences between pieces of the feature information and pieces of the location information include correspondences between pieces of the feature information and map coordinates, and before the Step 201, the method further includes: dividing a region managed by the positioning server into N sub-regions, wherein each of the sub-regions corresponds to one block of a grid and N is an integer greater than 1; determining map coordinates corresponding to each block of the grid based on pre-stored map coordinate information, so as to obtain correspondences between the blocks and the map coordinates; obtaining correspondences between the blocks and pieces of feature information by collecting feature information of each block; and establishing correspondences between pieces of the feature information and the map coordinates based on the correspondences between the blocks and the map coordinates as well as the correspondences between the blocks and pieces of the feature information.

Alternatively, after the step of establishing correspondences between pieces of the feature information and the map coordinates based on the correspondences between the blocks and the map coordinates as well as the correspondences between the blocks and pieces of the feature information, the method further includes: receiving GPS data transmitted by any terminal in the case that the GPS data has been received by the terminal, wherein the GPS data includes coordinate data and supplementary feature information; converting the coordinate data into target map coordinates; and adding a correspondence between the supplementary feature information and the target map coordinates into the correspondences between pieces of the feature information and the map coordinates.

To sum up, in the terminal positioning method according to the embodiments of the present disclosure, the image data is transmitted to the positioning server from the target terminal, and then the positioning server obtains the target feature information based on the image data, and looks up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

Figure 3:
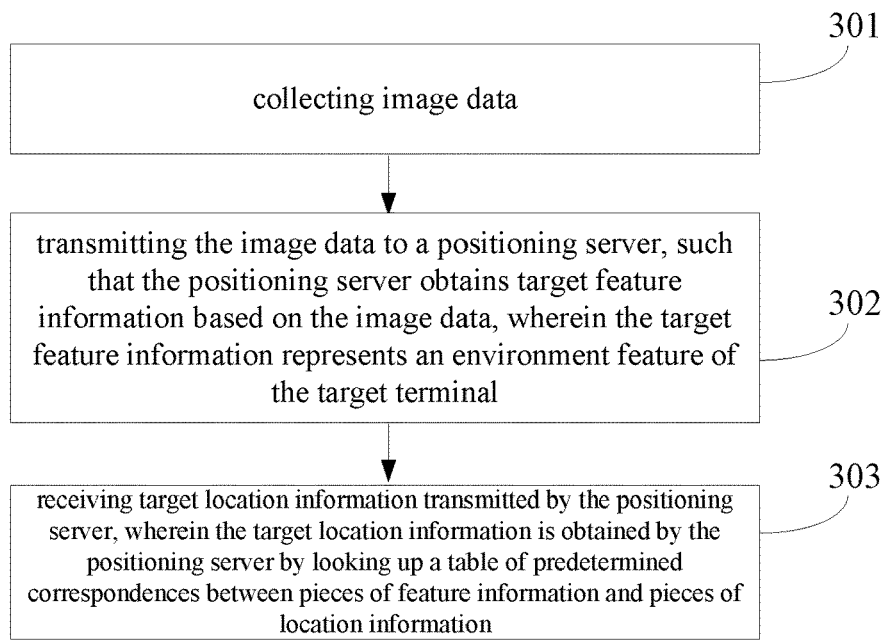
FIG. 3 is a flowchart showing another terminal positioning method according to the embodiments of the present disclosure.

The present disclosure provides in some embodiments another terminal positioning method for the target terminal 120 as shown in FIG. 1. As shown in FIG. 3, the method includes: Step 301: collecting image data; Step 302: transmitting the image data to a positioning server, such that the positioning server obtains target feature information based on the image data, wherein the target feature information represents an environment feature of the target terminal; and Step 303: receiving target location information transmitted by the positioning server, wherein the target location information is obtained by the positioning server by looking up a table of predetermined correspondences between pieces of feature information and pieces of location information.

To sum up, in the terminal positioning method according to the embodiments of the present disclosure, the image data is transmitted to the positioning server from the target terminal, and then the positioning server obtains the target feature information based on the image data, and looks up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

Alternatively, before the Step 302, the method further includes: detecting whether the target terminal has received GPS data.

Accordingly, the Step 301 includes: collecting the image data in the case that the target terminal has not yet received the GPS data.

Alternatively, the method further includes: transmitting the GPS data to the positioning server in the case that the target terminal has received the GPS data.

Alternatively, the pieces of the feature information include text feature information, structure feature information of objects, or the text feature information and the structure feature information of objects.

Alternatively, the image data is at least one of a picture and a video. Alternatively, the Step 301 includes: collecting at least one of the picture and the video as the image data.

To sum up, in the terminal positioning method according to the embodiments of the present disclosure, the image data is transmitted to the positioning server from the target terminal, and then the positioning server obtains the target feature information based on the image data, and looks up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

Figure 4:
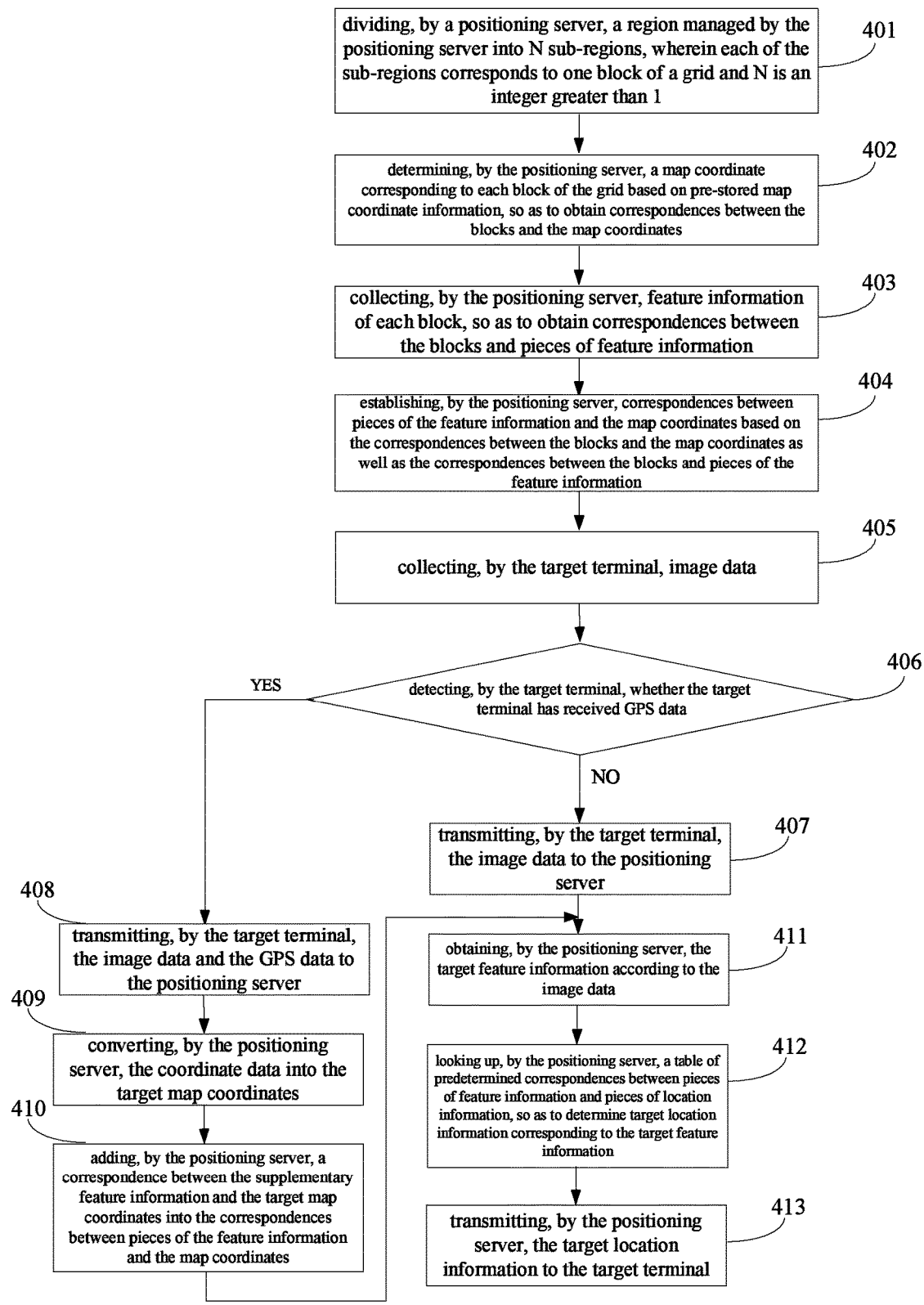
FIG. 4 is a flowchart showing yet another terminal positioning method according to the embodiments of the present disclosure.

As shown in FIG. 4, the present disclosure provides in some embodiments yet another terminal positioning method including following steps 401 through 413.

Step 401 includes: dividing, by a positioning server, a region managed by the positioning server into N sub-regions, wherein each of the sub-regions corresponds to one block of a grid and N is an integer greater than 1.

In the field of informatics, the grid may combine various geographically widely distributed resource such as data resource and information resource into a logical whole through the internet, so as to provide integral information and service to users and achieve geographical information sharing. In the embodiments of the present disclosure, the blocks of the grid represent the sub-regions obtained by dividing the region managed by the positioning server.

Step 402 includes: determining, by the positioning server, a map coordinate corresponding to each block of the grid based on pre-stored map coordinate information, so as to obtain correspondences between the blocks and the map coordinates.

The positioning server may be provided with a Location Based Service (LBS) module. The LBS module may determine the coordinates of each block based on the map coordinate information such as longitude and latitude information stored therein, so as to obtain the correspondences between the blocks and the map coordinates as shown in Table 1. For example, an identifier may be used to indicate each block, and the map coordinates include the longitude and latitude corresponding to each block. As shown in Table 1, the map coordinates of the block having an identifier ID1 are ranging from 105°17' to 110°11' east longitude, and 28°10' to 32°13' north latitude.

TABLE 1

| Block | Map Coordinates |
|---|---|
| ID1 | 105°17' to 110°11' east longitude, and 28°10' to 32°13' north latitude |
| ID2 | 113°4' to 119°53' east longitude, and 36°01' to 42°37' north latitude |
| ID3 | 110°14' to 114°33' east longitude, and 34°34' to 40°43' north latitude |

Step 403 includes: collecting, by the positioning server, feature information of each block, so as to obtain correspondences between the blocks and pieces of feature information.

The feature information of each block is collected, so as to establish the feature database corresponding to each block. Alternatively, the pieces of the feature information include text feature information, structure feature information of objects, or the text feature information and the structure feature information of objects. In other words, the feature information may include the text feature information, such as texts of "XX building" labeled on a certain building, "XX overpass" labeled on a certain overpass, and "XX bank" labeled on a certain bank. The feature information may further include structure feature information of objects, such as a shape of a fountain, an outline (inclusive of the number of floors) of a high building, a shape of a tree, and so forth. The feature information may include both the text feature information and the structure feature information of objects. The feature information may be obtained by the image recognition techniques in the related art. In other words, the feature information of each block may be obtained by the techniques in the related art, such as a combination of the big data technique and the cloud computing technique.

Table 2 shows the feature information corresponding to each block as shown in Table 1. For example, the block having the identifier ID1 may have the feature information of A1, A2, A3. For example, the content of A1 may be "XX building", the content of A2 may be in that "the number of floors of the building is 21", and the content of A3 may be in that "the fountain is at a plaza in front of the building and is of a lotus shape".

TABLE 2

| Block | Feature Information |
|---|---|
| ID1 | A1, A2, A3 |
| ID2 | B1, B2, B3, B4, B5 |
| ID3 | C1, C2 |

Step 404 includes: establishing, by the positioning server, correspondences between pieces of the feature information and the map coordinates based on the correspondences between the blocks and the map coordinates as well as the correspondences between the blocks and pieces of the feature information.

In the example of Tables 1 and 2, the positioning server manages correspondences between pieces of the feature information and the map coordinates as shown in Table 3, which is established based on the correspondences between the blocks and the map coordinates as shown in Table 1 as well as the correspondences between the blocks and pieces of the feature information as shown in Table 2. For example, the location with the map coordinates ranging from 105°17' to 110°11' east longitude, and 28°10' to 32°13' north latitude has the feature information including A1, A2 and A3.

TABLE 3

| Feature Information | Map Coordinates |
|---|---|
| A1, A2, A3 | 105°17' to 110°11' east longitude, and 28°10' to 32°13' north latitude |
| B1, B2, B3, B4, B5 | 113°04' to 119°53' east longitude, and 36°01' to 42°37' north latitude |
| C1, C2 | 110°14' to 114°33' east longitude, and 34°34' to 40°43' north latitude |

Step 405 includes: collecting, by the target terminal, image data.

The image data is at least one of a picture and a video, and the Step 405 includes: collecting, by the target terminal, at least one of the picture and the video as the image data.

The target terminal may be any device capable of obtaining image data, such as a mobile phone, a computer, a digital broadcasting terminal, a message transceiving device, a game console, a tablet device, a medical equipment, a fitness equipment or a personal digital assistant (PDA). In the embodiments of the present disclosure, it is assumed that a user of the target terminal has a normal thinking pattern, and thus the image data collected by the user through the target terminal may include the feature information of the location of the target terminal. The user may take pictures of a signpost or a high building mounted with a billboard with text thereon by the target terminal. It should be appreciated that the image data may be a picture or a video taken by the target terminal, or the like.

Step 406 includes: detecting, by the target terminal, whether the target terminal has received GPS data. In the case that the target terminal has not yet received the GPS data, the process proceeds to Step 407, and in the case that the target terminal has received the GPS data, the process proceeds to Step 408.

In the case that the target terminal is capable of receiving the GPS data, the target terminal may transmit the received GPS data to the positioning server, such that the positioning server may update and optimize the correspondences between the pieces of feature information and the map coordinates established in Step 404. As a result, more accurate target location information may be obtained to improve the positioning accuracy and reliability. The GPS data includes coordinate data and supplementary feature information, wherein the coordinate data may be used to obtain the map coordinates and update the previously obtained map coordinates, and the supplementary feature information may be used to supplement the previously obtained feature information.

It should be noted that the target terminal may be any terminal connected to the positioning server. The positioning server may update and optimize the established correspondences between the pieces of feature information and the based on the GPS data transmitted by any terminal.

Step 407 includes: transmitting, by the target terminal, the image data to the positioning server. Then, the process proceeds to Step 411.

In the case that the target terminal is incapable of receiving the GPS data, the target terminal transmits the collected image data to the positioning server, such that the positioning server may obtain the corresponding feature information according to the image data.

Step 408 includes: transmitting, by the target terminal, the image data and the GPS data to the positioning server. Then, the process proceeds to Step 409.

Step 409 includes: converting, by the positioning server, the coordinate data into the target map coordinates. Then, the process proceeds to Step 410.

After receiving the GPS data transmitted by the target terminal, the positioning server may convert the coordinate data included in the GPS data into the effective map coordinates. For example, in addition to the map coordinates, the coordinate data of the GPS data may further include other coordinate data having relatively low usage value. Thus, the positioning server may eliminate the coordinate data having relatively low usage value, so as to obtain the effective map coordinates. Each coordinate point on the map corresponds to a set of supplementary feature information.

Step 410 includes: adding, by the positioning server, a correspondence between the supplementary feature information and the target map coordinates into the correspondences between pieces of the feature information and the map coordinates. Then, the process proceeds to Step 411.

After the execution of Step 409, the correspondence between the supplementary feature information and the target map coordinates, as the increment information, may be added into the correspondences between pieces of the feature information and the map coordinates, such that the correspondences between the pieces of feature information and the map coordinates may be improved by such self-learning.

Step 411 includes: obtaining, by the positioning server, the target feature information according to the image data. Then, the process proceeds to Step 412.

The target feature information represents an environment feature of the target terminal. The positioning server may obtain the feature information corresponding to the image data, i.e. the target feature information based on the image data.

Step 412 includes: looking up, by the positioning server, a table of predetermined correspondences between pieces of feature information and pieces of location information, so as to determine target location information corresponding to the target feature information. Then, the process proceeds to Step 413.

The correspondences between pieces of the feature information and pieces of the location information may include correspondences between pieces of the feature information and map coordinates. For example, it is assumed that, at the present moment, the target feature information obtained by the positioning server based on the image data is target feature information A2 and A3. Thus, the following map coordinates, i.e. the target location information corresponding to the target feature information may be obtained by looking up the correspondences between the pieces of feature information and the pieces of location information in Table 3, i.e., 105°17' to 110°11' east longitude, and 28°10' to 32°13' north latitude.

Step 413 includes: transmitting, by the positioning server, the target location information to the target terminal.

For example, it is assumed that the target feature information in Step 412 is A2 and A3. Thus, after determining the target location information, the positioning server transmits the information of "105°17' to 110°11' east longitude, and 28°10' to 32°13' north latitude" to the target terminal, such that the target terminal may display the target location information for the user.

It should be appreciated that, in the above terminal positioning method, the sequence for executing the steps may be adjusted and the number of the steps may be increased or decreased, depending on the actual requirements. A person skilled in the art may made various modification and substitutions based on the description of the present disclosure, which also falls within the scope of the present disclosure.

To sum up, in the terminal positioning method according to the embodiments of the present disclosure, the image data is transmitted to the positioning server from the target terminal, and then the positioning server obtains the target feature information based on the image data, and looks up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

Figure 5:
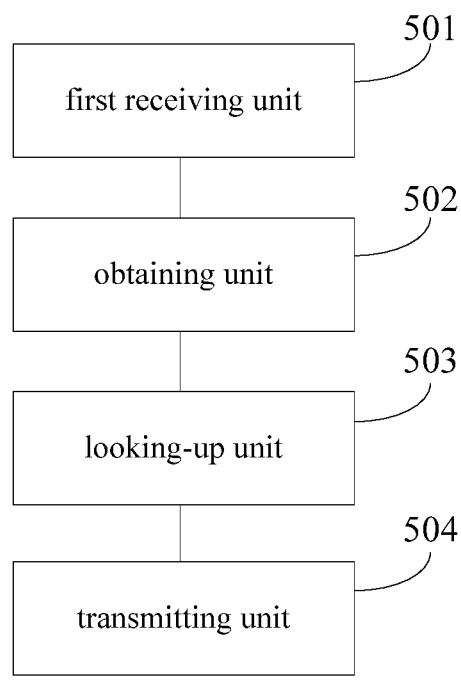
FIG. 5 is a schematic view showing a positioning server according to the embodiments of the present disclosure.

As illustrated in FIG. 5, the present disclosure provides in some embodiments a positioning server including: a first receiving unit 501 configured for receiving image data transmitted by a target terminal; an obtaining unit 502 configured for obtaining target feature information based on the image data, wherein the target feature information represents an environment feature of the target terminal; a looking-up unit 503 configured for looking up a table of predetermined correspondences between pieces of feature information and pieces of location information, so as to determine target location information corresponding to the target feature information; and a transmitting unit 504 configured for transmitting the target location information to the target terminal.

To sum up, in the embodiments of the present disclosure, the positioning server may receive the image data transmitted by the target terminal, and then obtain the target feature information based on the image data, and look up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

Figure 6:
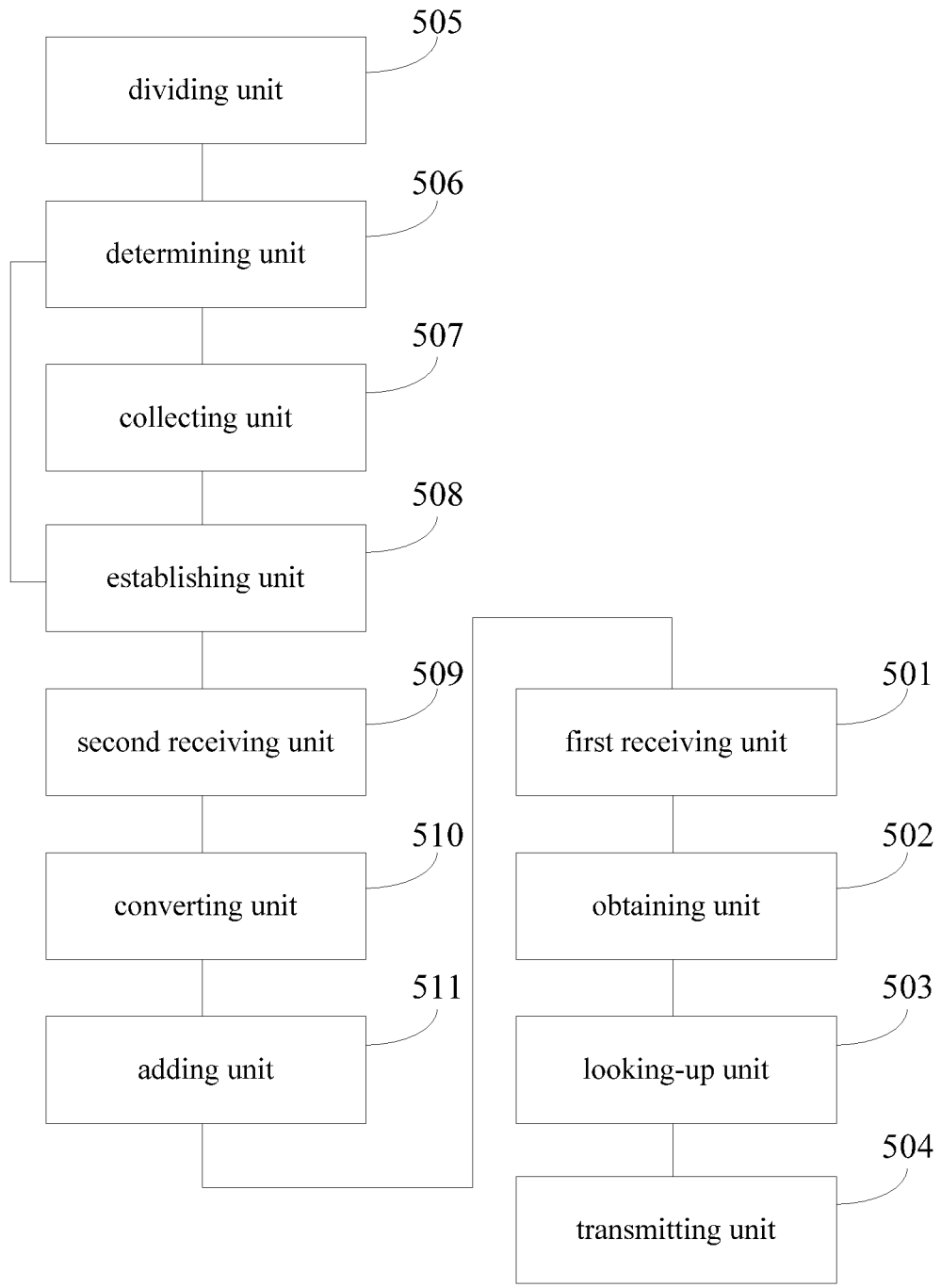
FIG. 6 is a schematic view showing another positioning server according to the embodiments of the present disclosure.

As illustrated in FIG. 6, the present disclosure provides in some embodiments another positioning server including: a first receiving unit 501 configured for receiving image data transmitted by a target terminal; a obtaining unit 502 configured for obtaining the target feature information based on the image data; wherein the target feature information represents an environment feature of the target terminal; a looking-up unit 503 configured for looking up a table of predetermined correspondences between pieces of feature information and pieces of location information, so as to determine target location information corresponding to the target feature information; a transmitting unit 504 configured for transmitting the target location information to the target terminal; a dividing unit 505 configured for dividing a region managed by the positioning server into N sub-regions, wherein each of the sub-regions corresponds to one block of a grid and N is an integer greater than 1; a determining unit 506 configured for determining a map coordinate corresponding to each block of the grid based on pre-stored map coordinate information, so as to obtain correspondences between the blocks and the map coordinates; a collecting unit 507 configured for obtaining correspondences between the blocks and pieces of feature information by collecting feature information of each block; an establishing unit 508 configured for establishing correspondences between pieces of the feature information and the map coordinates based on the correspondences between the blocks and the map coordinates as well as the correspondences between the blocks and pieces of the feature information; a second receiving unit 509 configured for receiving GPS data transmitted by any terminal in the case that the GPS data has been received by the terminal, wherein the GPS data includes coordinate data and supplementary feature information; a converting unit 510 configured for converting the coordinate data into a target map coordinates; and an adding unit 511 configured for adding a correspondence between the supplementary feature information and the target map coordinates into the correspondences between pieces of the feature information and the map coordinates.

To sum up, in the embodiments of the present disclosure, the positioning server may receive the image data transmitted by the target terminal, and then obtain the target feature information based on the image data, and look up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

Figure 7:
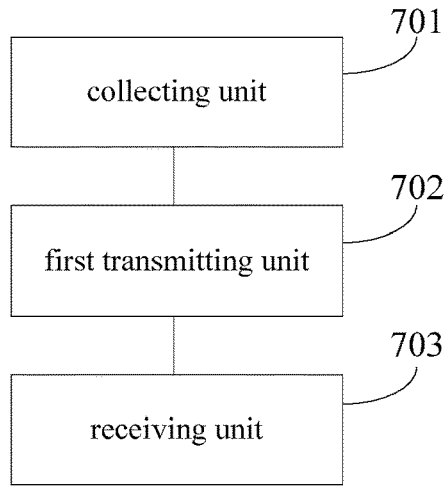
FIG. 7 is a schematic view showing a target terminal according to the embodiments of the present disclosure.

As shown in FIG. 7, the present disclosure provides in some embodiments a target terminal including: a collecting unit 701 configured for collecting image data; a first transmitting unit 702 configured for transmitting the image data to a positioning server, such that the positioning server obtains target feature information based on the image data, wherein the target feature information represents an environment feature of the target terminal; and a receiving unit 703 configured for receiving target location information transmitted by the positioning server, wherein the target location information is obtained by the positioning server by looking up a table of predetermined correspondences between pieces of feature information and pieces of location information.

To sum up, in the embodiments of the present disclosure, the target terminal may transmit the image data to the positioning server and receive the target location information from the positioning server, wherein the target location information is obtained by the positioning server by looking up a table of predetermined correspondences between pieces of feature information and pieces of location information based on the image data. As compared with the related art, the present disclosure may position a location of the terminal without GPS positioning, so as to improve the positioning accuracy and reliability.

Figure 8:
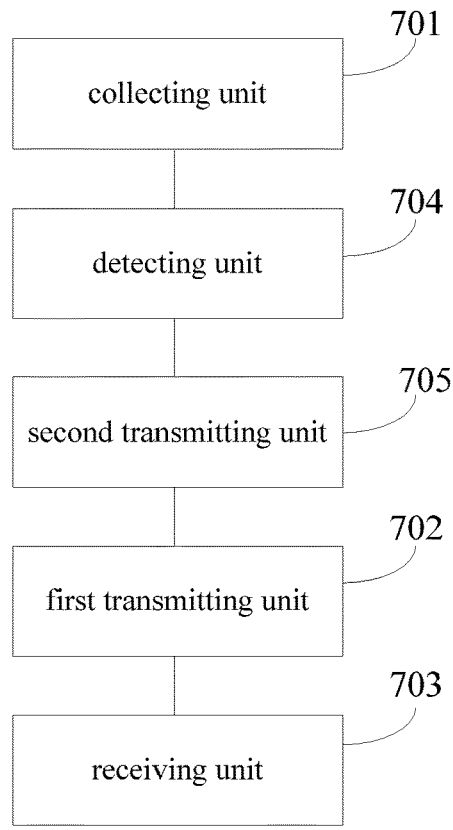
FIG. 8 is a schematic view showing another target terminal according to the embodiments of the present disclosure.

As shown in FIG. 8, the present disclosure provides in some embodiments another target terminal including: a collecting unit 701 configured for collecting image data; a first transmitting unit 702 configured for transmitting the image data to a positioning server, such that the positioning server obtains target feature information based on the image data, wherein the target feature information represents an environment feature of the target terminal; a receiving unit 703 configured for receiving target location information transmitted by the positioning server, wherein the target location information is obtained by the positioning server by looking up a table of predetermined correspondences between pieces of feature information and pieces of location information; a detecting unit 704 configured for detecting whether the target terminal has received GPS data, wherein the collecting unit 701 collects the image data in the case that the target terminal has not yet received the GPS data; and a second transmitting unit 705 configured for transmitting the GPS data to the positioning server in the case that the target terminal has received the GPS data.

Alternatively, the pieces of the feature information include text feature information, structure feature information of objects, or the text feature information and the structure feature information of objects.

Alternatively, the image data is at least one of a picture and a video, and accordingly, the collecting unit 701 collects at least one of the picture and the video as the image data.

To sum up, in the embodiments of the present disclosure, the target terminal may transmit the image data to the positioning server and receive the target location information from the positioning server, wherein the target location information is obtained by the positioning server by looking up a table of predetermined correspondences between pieces of feature information and pieces of location information based on the image data. As compared with the related art, the present disclosure may position a location of the terminal without GPS positioning, so as to improve the positioning accuracy and reliability.

Figure 9:
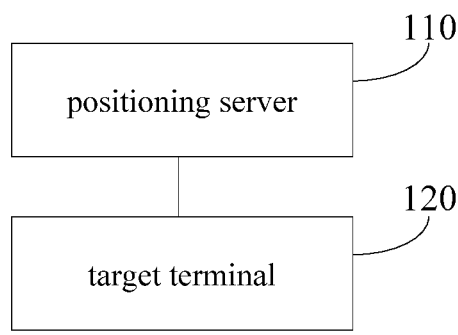
FIG. 9 is a schematic view showing a terminal positioning system according to the embodiments of the present disclosure.

As illustrated in FIG. 9, the present disclosure provides in some embodiments a terminal positioning system including the positioning server 110 and the target terminal 120. The positioning server 110 is configured for receiving image data transmitted by a target terminal; obtaining target feature information based on the image data, wherein the target feature information represents an environment feature of the target terminal; looking up a table of predetermined correspondences between pieces of feature information and pieces of location information, so as to determine target location information corresponding to the target feature information; and transmitting the target location information to the target terminal.

The target terminal 120 includes the target terminal as shown in FIG. 7 or the target terminal as shown in FIG. 8.

Alternatively, the correspondences between pieces of the feature information and pieces of the location information include correspondences between pieces of the feature information and map coordinates, and the positioning server 110 is further configured for: dividing a region managed by the positioning server into N sub-regions, wherein each of the sub-regions corresponds to one block of a grid and N is an integer greater than 1; determining map coordinates corresponding to each block of the grid based on pre-stored map coordinate information, so as to obtain correspondences between the blocks and the map coordinates; obtaining correspondences between the blocks and pieces of feature information by collecting feature information of each block; and establishing correspondences between pieces of the feature information and the map coordinates based on the correspondences between the blocks and the map coordinates as well as the correspondences between the blocks and pieces of the feature information.

Furthermore, the positioning server 110 is further configured for: receiving GPS data transmitted by any terminal in the case that the GPS data has been received by the terminal, wherein the GPS data includes coordinate data and supplementary feature information; converting the coordinate data into target map coordinates; and adding a correspondence between the supplementary feature information and the target map coordinates into the correspondences between pieces of the feature information and the map coordinates.

To sum up, in the terminal positioning system according to the embodiments of the present disclosure, the image data is transmitted to the positioning server from the target terminal, and then the positioning server obtains the target feature information based on the image data, and looks up a table of predetermined correspondences between pieces of feature information and pieces of location information, so as to determine target location information corresponding to the target feature information, and then transmits the target location information to the target terminal. Thus, the positioning process is accomplished. As compared with the related art, the present disclosure may position a location of the terminal without GPS positioning, so as to improve the positioning accuracy and reliability.

A person skilled in the art may understand that, the above systems, devices and units may operation according to the corresponding methods described above, which is not repeated herein.

The above are merely the preferred embodiments of the present disclosure and shall not be used to limit the scope of the present disclosure. Any further improvements, substitutes and modifications made without departing from the spirit and principle of the present disclosure shall also fall within the scope of the present disclosure.

What is claimed is:

1. A terminal positioning method for a positioning server comprising:
    dividing a region managed by the positioning server into N sub-regions, wherein each of the N sub-regions corresponds to one block of a grid, where N is an integer greater than 1;
    determining map coordinates corresponding to each block of the grid based on pre-stored map coordinate information, so as to obtain correspondences between the blocks and the map coordinates;
    obtaining correspondences between the blocks and pieces of feature information by collecting feature information of each block;
    establishing correspondences between pieces of the feature information and the map coordinates based on the correspondences between the blocks and the map coordinates as well as the correspondences between the blocks and pieces of the feature information;
    receiving image data transmitted by a target terminal;
    obtaining target feature information based on the image data, wherein the target feature information represents an environment feature of the target terminal;
    looking up a table of predetermined correspondences between pieces of feature information and pieces of location information, so as to determine target location information corresponding to the target feature information; and
    transmitting the target location information to the target terminal,
    wherein the correspondences between pieces of the feature information and pieces of the location information include the correspondences between pieces of the feature information and map coordinates.

2. The method according to claim 1, wherein after the step of establishing correspondences between pieces of the feature information and the map coordinates based on the correspondences between the blocks and the map coordinates as well as the correspondences between the blocks and pieces of the feature information, the method further comprises:
    receiving Global Positioning System (GPS) data transmitted by any terminal in the case that the GPS data has been received by the terminal, wherein the GPS data comprises coordinate data and supplementary feature information;
    converting the coordinate data into target map coordinates; and
    adding a correspondence between the supplementary feature information and the target map coordinates into the correspondences between pieces of the feature information and the map coordinates.

3. A terminal positioning method for a target terminal comprising:
    dividing a region managed by a positioning server into N sub-regions, wherein each of the N sub-regions corresponds to one block of a grid, where N is an integer greater than 1;
    determining map coordinates corresponding to each block of the grid based on pre-stored map coordinate information, so as to obtain correspondences between the blocks and the map coordinates;
    obtaining correspondences between the blocks and pieces of feature information by collecting feature information of each block;
    establishing correspondences between pieces of the feature information and the map coordinates based on the correspondences between the blocks and the map coordinates as well as the correspondences between the blocks and pieces of the feature information;
    collecting image data;
    transmitting the image data to the positioning server, such that the positioning server obtains target feature information based on the image data, wherein the target feature information represents an environment feature of the target terminal; and
    receiving target location information transmitted by the positioning server, wherein the target location information is obtained by the positioning server by looking up a table of predetermined correspondences between pieces of feature information and pieces of location information.

4. The method according to claim 3, wherein before the step of transmitting the image data to the positioning server, the method further comprises:
    detecting whether the target terminal has received Global Positioning System (GPS) data; and
    the step of collecting the image data comprises:
    collecting the image data in the case that the target terminal has not yet received the GPS data.

5. The method according to claim 4, further comprising:
transmitting the GPS data to the positioning server in the case that the target terminal has received the GPS data.

6. The method according to claim 3, wherein
the pieces of the feature information comprise text feature information, structure feature information of objects, or the text feature information and the structure feature information of objects.

7. The method according to claim 3, wherein the image data is at least one of a picture and a video, and
the step of collecting the image data comprises:
collecting at least one of the picture and the video as the image data.

8. A positioning server configured for:
dividing a region managed by the positioning server into N sub-regions, wherein each of the N sub-regions corresponds to one block of a grid, where N is an integer greater than 1;
determining map coordinates corresponding to each block of the grid based on pre-stored map coordinate information, so as to obtain correspondences between the blocks and the map coordinates;
obtaining correspondences between the blocks and pieces of feature information by collecting feature information of each block;
establishing correspondences between pieces of the feature information and the map coordinates based on the correspondences between the blocks and the map coordinates as well as the correspondences between the blocks and pieces of the feature information;
receiving image data transmitted by a target terminal;
obtaining target feature information based on the image data, wherein the target feature information represents an environment feature of the target terminal;
looking up a table of predetermined correspondences between pieces of feature information and pieces of location information, so as to determine target location information corresponding to the target feature information; and
transmitting the target location information to the target terminal,
wherein the correspondences between pieces of the feature information and pieces of the location information include the correspondences between pieces of the feature information and map coordinates.

9. The positioning server according to claim 8, further configured for:
after the step of establishing correspondences between pieces of the feature information and the map coordinates based on the correspondences between the blocks and the map coordinates as well as the correspondences between the blocks and pieces of the feature information, the method further comprises:
receiving Global Positioning System (GPS) data transmitted by any terminal in the case that the GPS data has been received by the terminal, wherein the GPS data comprises coordinate data and supplementary feature information;
converting the coordinate data into target map coordinates; and
adding a correspondence between the supplementary feature information and the target map coordinates into the correspondences between pieces of the feature information and the map coordinates.

10. A target terminal configured for:
dividing a region managed by a positioning server into N sub-regions, wherein each of the N sub-regions corresponds to one block of a grid, where N is an integer greater than 1;
determining map coordinates corresponding to each block of the grid based on pre-stored map coordinate information, so as to obtain correspondences between the blocks and the map coordinates;
obtaining correspondences between the blocks and pieces of feature information by collecting feature information of each block;
establishing correspondences between pieces of the feature information and the map coordinates based on the correspondences between the blocks and the map coordinates as well as the correspondences between the blocks and pieces of the feature information;
collecting image data;
transmitting the image data to the positioning server, such that the positioning server obtains target feature information based on the image data, wherein the target feature information represents an environment feature of the target terminal; and
receiving target location information transmitted by the positioning server, wherein the target location information is obtained by the positioning server by looking up a table of predetermined correspondences between pieces of feature information and pieces of location information.

11. The target terminal according to claim 10, further configured for:
before the step of transmitting the image data to the positioning server, detecting whether the target terminal has received Global Positioning System (GPS) data; and
wherein the step of collecting the image data comprises collecting the image data in the case that the target terminal has not yet received the GPS data.

12. The target terminal according to claim 11, further configured for:
transmitting the GPS data to the positioning server in the case that the target terminal has received the GPS data.

13. The target terminal according to claim 10, wherein
the pieces of the feature information include text feature information, structure feature information of objects, or the text feature information and the structure feature information of objects.

14. The target terminal according to claim 10, wherein the image data is at least one of a picture and a video, and
the step of collecting the image data comprises:
collecting at least one of the picture and the video as the image data.

15. A terminal positioning system comprising a positioning server and the target terminal according to claim 10;
wherein the positioning server is configured for dividing a region managed by the positioning server into N sub-regions, wherein each of the N sub-regions corresponds to one block of a grid, where N is an integer greater than 1; determining map coordinates corresponding to each block of the grid based on pre-stored map coordinate information, so as to obtain correspondences between the blocks and the map coordinates; obtaining correspondences between the blocks and pieces of feature information by collecting feature information of each block; establishing correspondences between pieces of the feature information and the map coordinates based on the correspondences between the blocks and the map coordinates as well as the correspondences between the blocks and pieces of the feature information; receiving image data transmitted by a target terminal; obtaining target feature information based on the image data, wherein the target feature information represents an environment feature of the target terminal; looking up a table of predetermined correspondences between pieces of feature information and pieces of location information, so as to determine target location information corresponding to the target feature information; and transmitting the target location information to the target terminal, wherein the correspondences between pieces of the feature information and pieces of the location information include the correspondences between pieces of the feature information and map coordinates.

16. The terminal positioning system according to claim 15, wherein the positioning server is further configured for:

receiving Global Positioning System (GPS) data transmitted by any terminal in the case that the GPS data has been received by the terminal, wherein the GPS data comprises coordinate data and supplementary feature information;

converting the coordinate data into target map coordinates; and adding a correspondence between the supplementary feature information and the target map coordinates into the correspondences between pieces of the feature information and the map coordinates.

17. The terminal positioning system according to claim 15, wherein the positioning server and a plurality of the target terminals communicates with one another via a wireless network or a cable network.

* * * * *